(12) United States Patent
Sung et al.

(10) Patent No.: US 8,259,629 B2
(45) Date of Patent: *Sep. 4, 2012

(54) SYSTEM AND METHOD FOR TRANSMITTING AND RECEIVING WIDEBAND SPEECH SIGNALS WITH A SYNTHESIZED SIGNAL

(75) Inventors: Ho-Sang Sung, Daejeon (KR); Dae-Hwan Hwang, Daejeon (KR); Dae-Hee Youn, Seoul (KR); Hong-Goo Kang, Seoul (KR); Young-Cheol Park, Wonju (KR); Ki-Seung Lee, Seoul (KR); Sung-Kyo Jung, Seoul (KR); Kyung-Tae Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 341 days.

This patent is subject to a terminal disclaimer.

(21) Appl. No.: 12/631,396

(22) Filed: Dec. 4, 2009

(65) Prior Publication Data

US 2010/0082335 A1    Apr. 1, 2010

Related U.S. Application Data

(63) Continuation of application No. 10/740,937, filed on Dec. 18, 2003, now Pat. No. 7,649,856.

(30) Foreign Application Priority Data

Dec. 20, 2002   (KR) .................. 10-2002-0081663

(51) Int. Cl.
*H04B 3/20* (2006.01)
*G10L 19/00* (2006.01)

(52) U.S. Cl. .................................... 370/286; 704/205
(58) Field of Classification Search ............ 370/286; 704/205

See application file for complete search history.

(56) References Cited

U.S. PATENT DOCUMENTS

| | | |
|---|---|---|
| 5,068,899 A | 11/1991 | Ellis et al. |
| 6,233,356 B1 | 5/2001 | Haskell et al. |
| 6,526,384 B1 | 2/2003 | Mueller et al. |
| 6,691,082 B1 | 2/2004 | Aguilar et al. |
| 6,700,933 B1 | 3/2004 | Wu et al. |
| 6,898,313 B2 | 5/2005 | Li et al. |
| 6,917,714 B2 | 7/2005 | Rose |
| 6,961,383 B1 | 11/2005 | Reibman et al. |
| 7,233,893 B2 | 6/2007 | Sung et al. |
| 7,649,856 B2 * | 1/2010 | Sung et al. ............ 370/286 |
| 2002/0103638 A1 | 8/2002 | Gao |
| 2003/0002579 A1 | 1/2003 | Radha et al. |

(Continued)

OTHER PUBLICATIONS

2000 IEEE, "A 16-KBIT/s Bandwidth Scalable Audio Coder Based on the G.729 Standard", K. Koishida, et al., pp. 1149-1152.

(Continued)

*Primary Examiner* — Susan McFadden
(74) *Attorney, Agent, or Firm* — Staas & Halsey LLP (57) ABSTRACT

A system for transmitting and receiving a wideband speech signal includes an A/D converter for receiving an analog speech signal to convert it into a digital speech signal, encoding a difference between a baseband speech signal and a standard baseband between a synthesized standard baseband signal, and an IP network interface for multiplexing the coded standard and additional baseband signals and enhancement residual band signal.

10 Claims, 9 Drawing Sheets

U.S. PATENT DOCUMENTS

| | | |
|---|---|---|
| 2003/0050786 A1 | 3/2003 | Jax et al. |
| 2004/0022318 A1 | 2/2004 | Garrido et al. |
| 2004/0054529 A1 | 3/2004 | Sung et al. |
| 2004/0136447 A1 | 7/2004 | LeBlanc |
| 2006/0029133 A1 | 2/2006 | Chen |

OTHER PUBLICATIONS

School of Electrical Engineering and Telecommunications, "Wideband Speech and Audio Coding Using Gammatone Filter Banks", E. Ambikairajah, et al., 4 pages.

ITU-T, Coding of Speech at 8kbps using conjugate-structure algeric-code-excited liner-prediticion, Mar. 1996, G.729, ITU, entire document.

Non-Final Office Action mailed on Aug. 31, 2007, in parent U.S. patent application, U.S. Appl. No. 10/740,937.

Non-Final Office Action mailed on Apr. 30, 2008, in parent U.S. patent application, U.S. Appl. No. 10/740,937.

Final Office Action mailed on Sep. 15, 2009, in parent U.S. patent application, U.S. Appl. No. 10/740,937.

Notice of Allowance mailed on Nov. 3, 200p, in parent U.S. patent application, U.S. Appl. No. 10/740,937, 2009.

\* cited by examiner

SYSTEM AND METHOD FOR TRANSMITTING AND RECEIVING WIDEBAND SPEECH SIGNALS WITH A SYNTHESIZED SIGNAL

CROSS REFERENCE TO RELATED APPLICATION

This application is continuation application of U.S. Ser. No. 10/740,937, filed on Dec. 18, 2003 now U.S. Pat. No. 7,649,856, which claims benefit of Korea Patent Application No. 2002-81663 filed on Dec. 20, 2002 in the Korean Intellectual Property Office, the content of which is incorporated herein by reference.

BACKGROUA/D OF THE INVENTION (a) Field of the Invention

The present invention generally relates to a system and method for transmitting and receiving wideband speech signals.

(b) Description of the Related Art

A wideband speech signal has a frequency of 0-8 kHz, which is twice that of a currently used telephone-line band, at 0-4 kHz. The wideband speech signal is suitable for a next-generation speech communication system because it is less artificial than a signal of the telephone-line band, and has high intelligibility.

The G.711 is one of the methods of digitalizing and compressing a speech signal of the telephone-line band, which has been standardized by ITU-T (International Telecommunication Union-Telecommunication Standardization sector) for the first time. G.711 uses nonlinear pulse code modulation (u/A-PCM), and it is known that its performance is similar to the original speech signal at 64 kbit/s. Other speech compression methods standardized by ITU-T include G.726 (adaptive differential pulse code modulation, ADPCM, 32 kbit/s), G.728 (low delay code excited linear prediction, LD-CELP, 16 kbit/s), G.729 (conjugate structure algebraic code excited linear prediction, CS-ACELP, 8 kbit/s), and G.723.1 (ACELP/MP-MLQ, 5.3/6.3 kbit/s).

Among ITU-T standard speech coders, G.723.1 and G.729 were adopted as a VoIP (Voice over Internet Protocol) standard coder on the Internet. G.723.1, developed for the purpose of compressing multimedia signals at a low rate, is an algorithm capable of compressing and decompressing input speech at two bit rates of 5.3 kbit/s and 6.3 kbit/s. G.723.1 uses the analysis-by-synthesis method, which has the widest application field among speech coding methods, and provides toll quality as high as that of a wired network. ITU-T G.729 is an algorithm capable of compressing and decompressing input speech at the rate of 8 kbit/s using an algebraic codebook, and it also provides toll quality as high as that of the wired network. Furthermore, ITU-T G.729A (G.729 Annex A) has the same transmission parameter as that of G.729 so it has compatibility with G.729 and it has advantages in complexity. Accordingly, G.729A is widely used in actual systems.

The above-described speech coding methods or systems with low transmission rates that provide toll quality as high as that of wired networks have created new services in mobile communications and Internet phone services. In particular, VoIP on the Internet is being spread very rapidly due to inexpensive telephone charges. However, the aforementioned conventional coding methods or systems have had poor service quality because of low quality and long delay time caused by packet loss on the Internet. With the development of communication networks and protocols, however, most of the problems in the conventional coding methods or systems with respect to delay time generated on networks have been solved. Recently, attempts to extend a speech signal to a wideband signal having a frequency (0-8 kHz) twice that of telephone-line band (0-4 kHz) to improve toll quality have been made. However, the 16 kHz wideband speech codec, which has been already standardized, has no backward compatibility with the telephone-line band codec currently being used for VoIP services so a new communication system must be designed in order to use signals of the two different systems. Furthermore, since the wideband signal occupies a wide bandwidth, a network capable of processing a large amount of data is needed. Accordingly, there are many problems in providing new services with the current systems.

SUMMARY OF THE INVENTION

An object of the present invention is to provide a system and method for transmitting and receiving a wideband speed signal, which is compatible with the conventional systems and provides a sampled 16 kHz wideband speech signal with high quality.

To accomplish the object of the present invention, there is provided a system for transmitting a wideband speech signal, comprising an A/D converter for receiving an analog speech signal to convert it into a digital speech signal; an acoustic echo canceller for receiving the digital speech signal and canceling echo of the digital speech signal; an encoder for receiving the speech signal from which echo has been removed from the acoustic echo canceller to separate a baseband speech signal from the received signal, standard-coding the baseband speech signal to generate a standard baseband signal, coding a difference between the baseband speech signal and the standard baseband signal to generate an additional baseband signal, and coding a difference between a signal obtained by synthesizing the standard baseband signal and the additional baseband signal and the baseband speech signal to generate an enhancement residual band signal; and an IP network interface for receiving the standard baseband signal, the additional baseband signal, and the enhancement residual band signal generated by the encoder, multiplexing them, and transmitting the multiplexed signals to an external network connected to the transmitting system.

To accomplish the object of the present invention, there is also provided a system for receiving a wideband speech signal, comprising an IP network interface for demultiplexing a speech signal transmitted through a network to extract a coded standard baseband signal, a coded additional baseband signal, and a coded enhancement residual band signal; a decoder for standard-decoding the standard baseband signal, decoding the additional baseband signal, and synthesizing the decoded signals to generate a baseband synthesis signal, and decoding the enhancement residual band signal and synthesizing the decoded enhancement residual band signal and the baseband synthesis signal to generate a final decoded speech signal; an acoustic echo canceller for canceling echo of the decoded speech signal; and a D/A converter for receiving the speech signal from which echo has been removed to converting it into an analog signal.

BRIEF DESCRIPTION OF THE DRAWINGS

Further objects and advantages of the invention can be more fully understood from the following detailed description taken in conjunction with the accompanying drawings, in which.

DETAILED DESCRIPTION OF THE PREFERRED EMBODIMENT

The present invention will now be described in connection with preferred embodiments with reference to the accompanying drawings.

Figure 1:
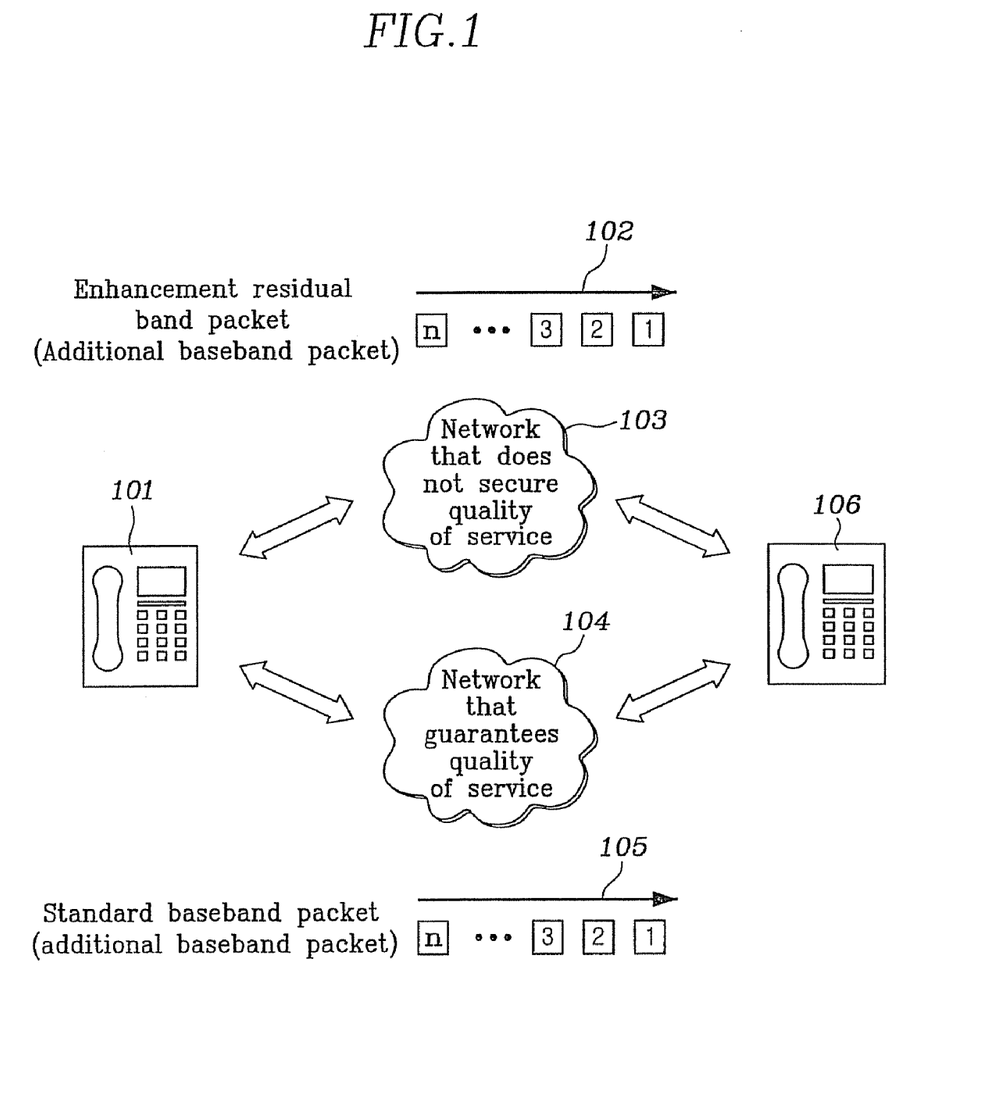
FIG. 1 shows a communication network to which a transmitter and a receiver according to the present invention are applied.

FIG. 1 shows a communication network to which a transmitter and a receiver according to the present invention are applied. In the configuration shown in FIG. 1, a network 104 that secures quality of service (QoS) and a network 103 that does not guarantee quality of service are simultaneously provided. In this configuration, IP terminals 101 and 106 represent terminals that are capable of generating and transmitting IP packets. Each IP terminal includes a microphone and a speaker that can receive and output speech signals, and a terminal through which a user can make a phone call. The IP terminal can be realized in various ways, using a telephone or a personal computer for instance. In the case that packets generated by one IP terminal 101 are transmitted to another IP terminal 106, the packets are divided into standard baseband packets 105, additional baseband packets, and enhancement residual band packets 102. In FIG. 1, the number attached to each of packets 102 and 105 represents a time stamp.

The standard baseband packets 105 are transmitted through the network 104 that guarantees quality of service because they hold important information required for speech communication. The additional baseband packets can be sent when a quality of service channel has sufficient capacity. In the case that only the baseband is used, intelligibility and naturalness of speech are considerably deteriorated although meaning is transmitted to a counterpart in speech communication. Accordingly, a user who wants speech quality corresponding to face-to-face communication can use high speech-quality communication when decoding is carried out even using the enhancement residual band packets transmitted through the network 103 that does not secure quality of service. Since the packets transmitted through the network 103 not securing quality of service have irregular delays, packet loss, and jitter, the IP terminal 106 corresponding to a receiving part uses a device for improving quality of service, such as a jitter buffer, FEC (frame error control) device, or the like, for synchronization of packets so as to maximize speech quality. In the case that a variation in the channel capacity of a network can be detected in real time, frame size can be varied with time.

Figure 2:
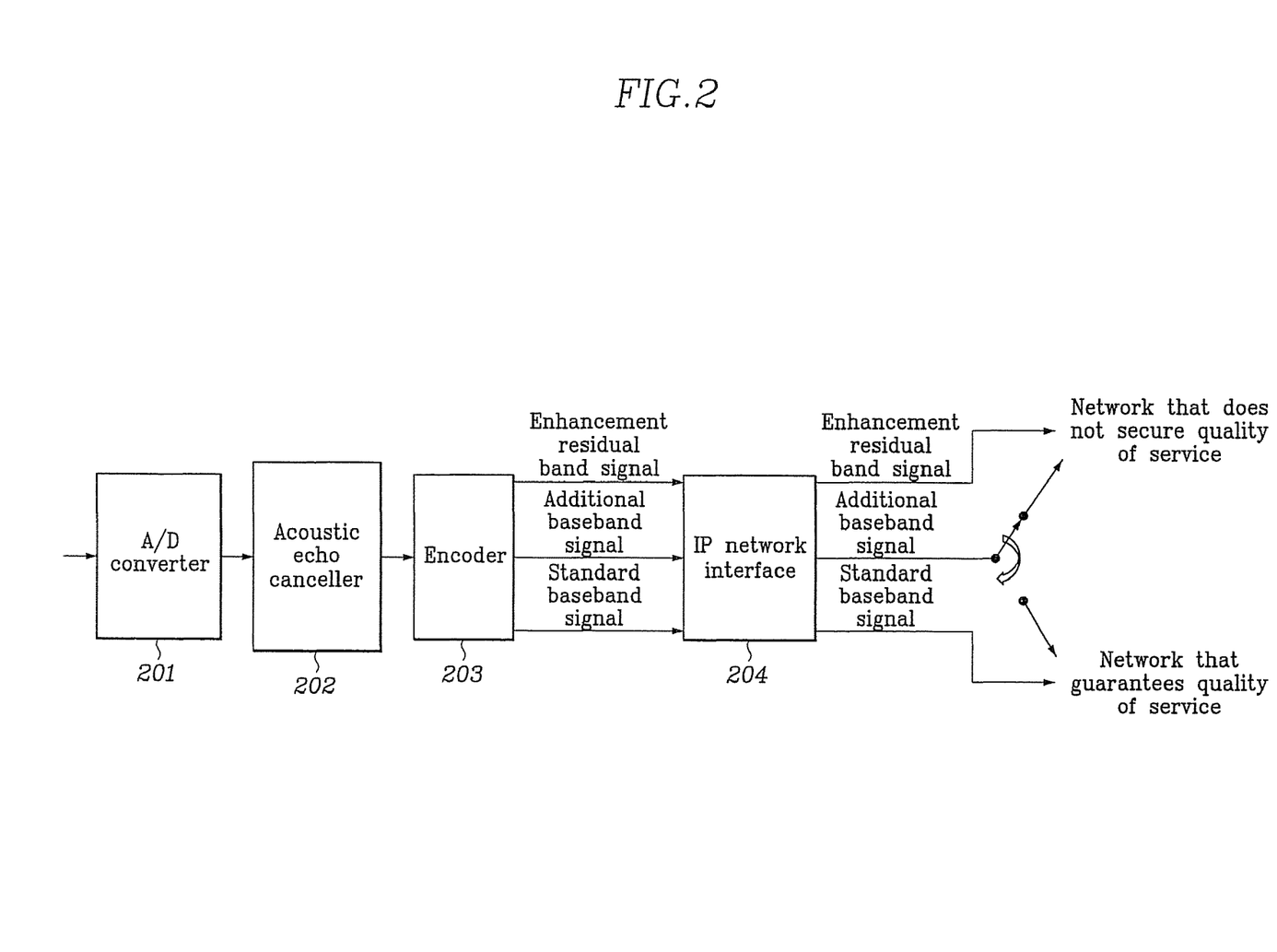
FIG. 2 shows the configuration of the transmitter according to the present invention.
Figure 3:
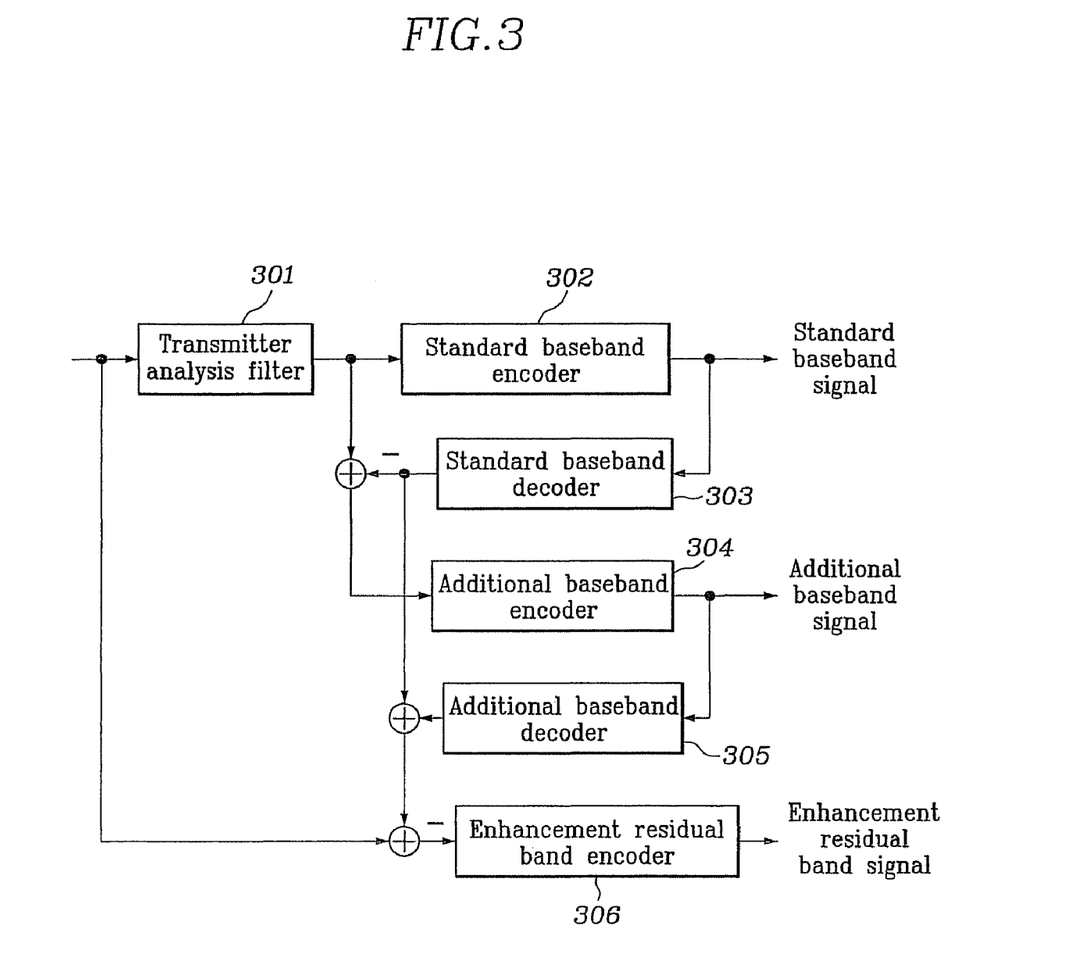
FIG. 3 shows the encoder of the transmitter of FIG. 2 in detail.

A wideband speech signal transmitter according to a preferred embodiment of the present invention is explained below with reference to FIG. 2 and FIG. 3. FIG. 2 shows the configuration of the transmitter according to the present invention, and FIG. 3 shows the encoder of the transmitter of FIG. 2 in detail.

As shown in FIG. 2, the transmitter of the invention includes an A/D converter 201, an acoustic echo canceller 202, an encoder 203, and an IP network interface 204. The A/D converter 201 receives an analog speech signal of a user through a microphone to convert it into a digital speech signal. The acoustic echo canceller 202 cancels echo in the speech signal received from the A/D converter 201. It is possible to use an acoustic echo canceller standardized by ITU-T G.167 as the acoustic echo canceller of the invention. In the embodiment of the present invention, the signal applied to and outputted from the acoustic echo canceller 202 has a frequency of 0-8 kHz, and it is a 16-bit linear PCM signal having a sampling rate of 16 kHz.

The encoder 203 receives the signal from which the echo has been removed, from the acoustic echo canceller 202, and codes a baseband signal and an enhancement residual band signal. The enhancement residual band signal is obtained from a difference between the original signal and the baseband signal. A detailed configuration of the encoder 203 is shown in FIG. 3, which will be explained later in more detail.

The IP network interface 204 multiplexes the input signal consisting of the standard baseband signal, the additional baseband signal, and the enhancement residual band signal in various manners according to the structure of an IP network to efficiently transmit packets. The IP network interface 204 can have various options according to the structure of an external network connected thereto. The options are as follows. First, if all of networks provided for speech communication guarantee quality of service, the IP network interface simultaneously packetizes the standard baseband signal, the additional baseband signal, and the enhancement residual band signal, or packetizes only the standard baseband signal and the additional baseband signal to transmit them. Secondly, in the case that a network that secures quality of service and a network that does not guarantee quality of service are simultaneously connected to the network interface, the network interface transmits the standard baseband signal and the additional baseband signal, which are relatively important information, through the network that secures quality of service and delivers the enhancement residual band signal through the network that does not guarantee quality of service. This case provides speech quality much better than that obtained in the case of using only the baseband signals even when packet error or jitter is generated on the network that does not secure quality of service. Finally, when all networks connected to the network interface do not guarantee quality of service, the network interface 204 simultaneously packetizes the baseband signals and enhancement residual band signal or packetizes only the baseband signals to transmit them as in the first case.

Figure 9:
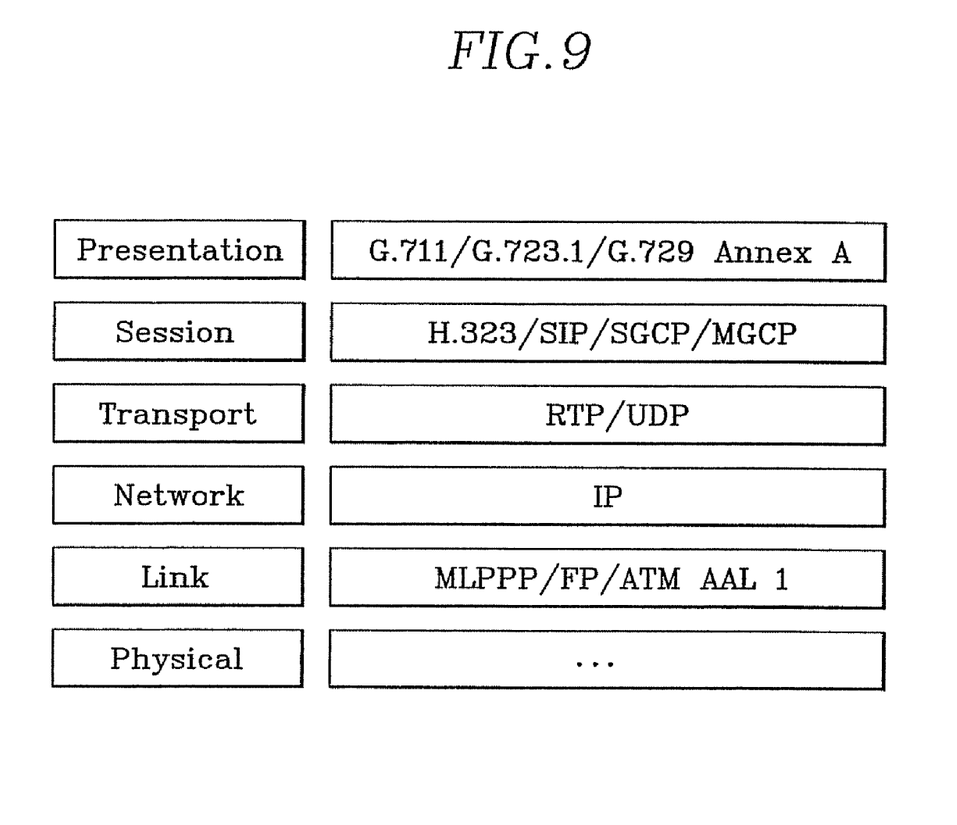
FIG. 9 shows the structure of a general VoIP service protocol.

The IP network interface 204 generates packets in the form as shown in FIG. 9. While the VoIP currently being provided is constructed of a combination of various protocols, the present invention can be applied to any combination of protocols described in FIG. 9.

Figure 4:
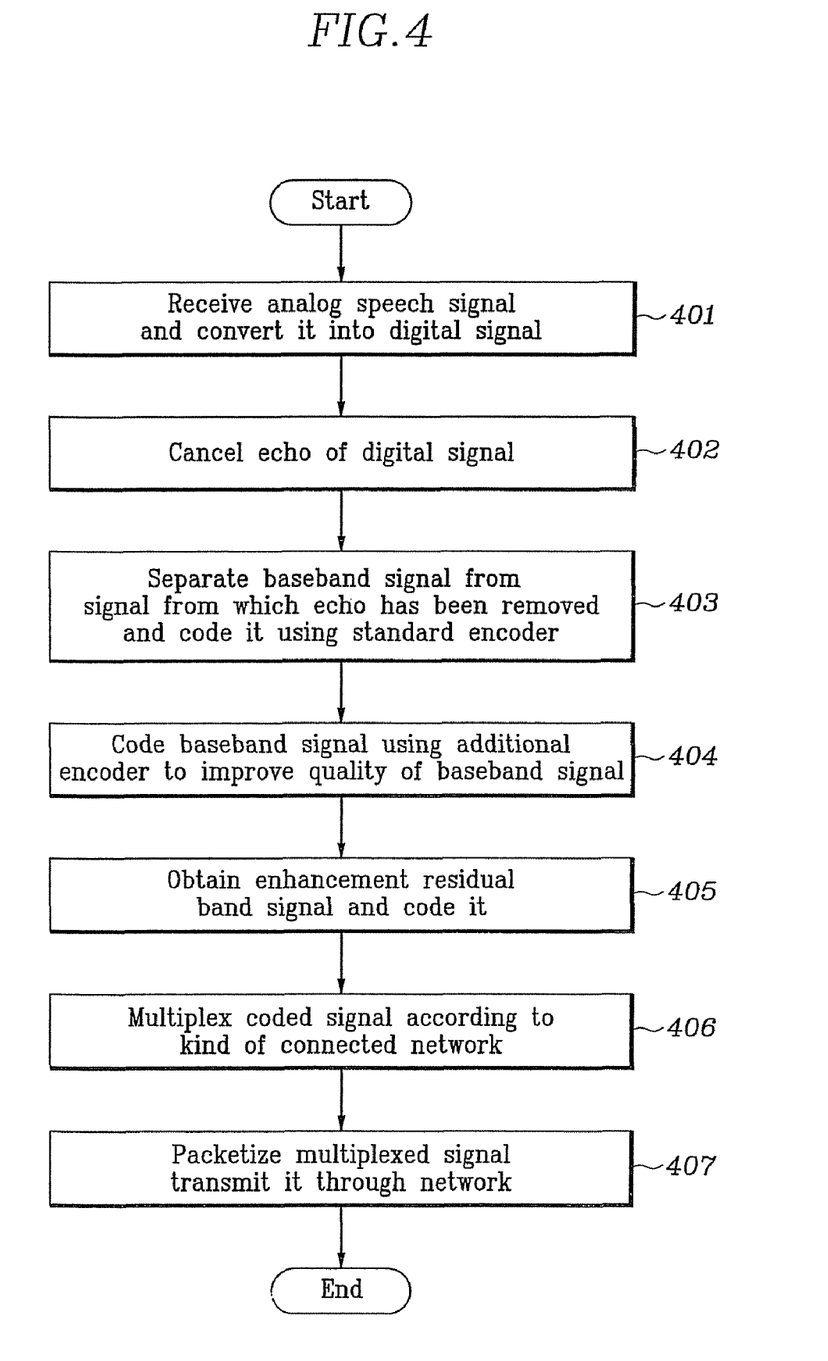
FIG. 4 is a flow chart showing a transmission method according to the present invention.

FIG. 3 illustrates the encoder 203 shown in FIG. 2 in more detail. Referring to FIG. 3, the encoder 203 includes a transmitter analysis filter 301, a standard baseband encoder 302, a standard baseband decoder 303, an additional baseband encoder 304, an additional baseband decoder 305, and an enhancement residual band encoder 306. The transmitter analysis filter 301 receives a digital speech signal that is a 16-bit linear PCM signal having a bandwidth of 0-8 kHz sampled at 16 kHz, to output a baseband speech signal having a bandwidth of 0-4 kHz at the sampling rate of 8 kHz. The standard baseband encoder 302 accepts the baseband speech signal and encodes it according to G.723.1 or G.729A, which are standard encoding methods, to output a coded standard baseband signal. The additional baseband encoder 304 receives a difference signal between a filtered baseband speech signal and the signal decoded by the standard baseband decoder 303 and codes it through waveform coding or transform coding, to generate an additional baseband signal. The enhancement residual band encoder 306 up-samples a signal, acquired by synthesizing the signals outputted from the standard baseband decoder 303 and additional baseband decoder 305, at 16 kHz, obtains a difference between the up-sampled signal and the speech signal applied to the transmitter analysis filter 301, and applies waveform coding or transform coding to the obtained difference signal, to generate an enhancement residual band signal. Here, a method of using human acoustic characteristics can be used. Next, a method of transmitting a wideband speech signal according to an embodiment of the present invention is explained with a reference to FIG. 4. FIG. 4 is a flow chart showing the transmission method according to the present invention.

When the transmission operation starts, an analog speech signal is received and converted into a digital signal at step 401. Then, echo in the digital speech signal is cancelled at step S402. Subsequently, the speech signal from which echo has been removed passes through a low pass filter to obtain only a baseband signal, and this baseband signal is coded by the standard baseband encoder, at step 403. In preparation for deterioration in the performance of the transmitter due to the standard coding, the additional baseband encoder codes the baseband speech signal at step 404. At step 405, the sampling frequency of a signal obtained by decoding a standard baseband signal and an additional baseband signal is doubled, and then an enhancement residual band signal is obtained from a difference between the signal having the doubled sampling frequency and the original 16 kHz speech signal from which echo has been cancelled and coded. At step 406, the coded speech signals are multiplexed in various manners according to the kind of network connected to the transmitter. The multiplexed signals are packetized and transmitted through the network at step S407.

As described above, the digital speech signal converted from the analog speech signal is a 16-bit linear PCM signal and has a sampling rate of 16 kHz. In addition, each of the standard baseband signal and the additional baseband signal can have a sampling rate of 8 kHz and a bandwidth of 0-4 kHz or 4-8 kHz. Furthermore, the standard baseband signal conforms to the G.723.1 or G.729A coding technique, and waveform coding or transform coding that is applied to the standard baseband signal can be used for the additional baseband signal. The enhancement residual band signal can also be coded through waveform coding or transform coding.

Figure 5:
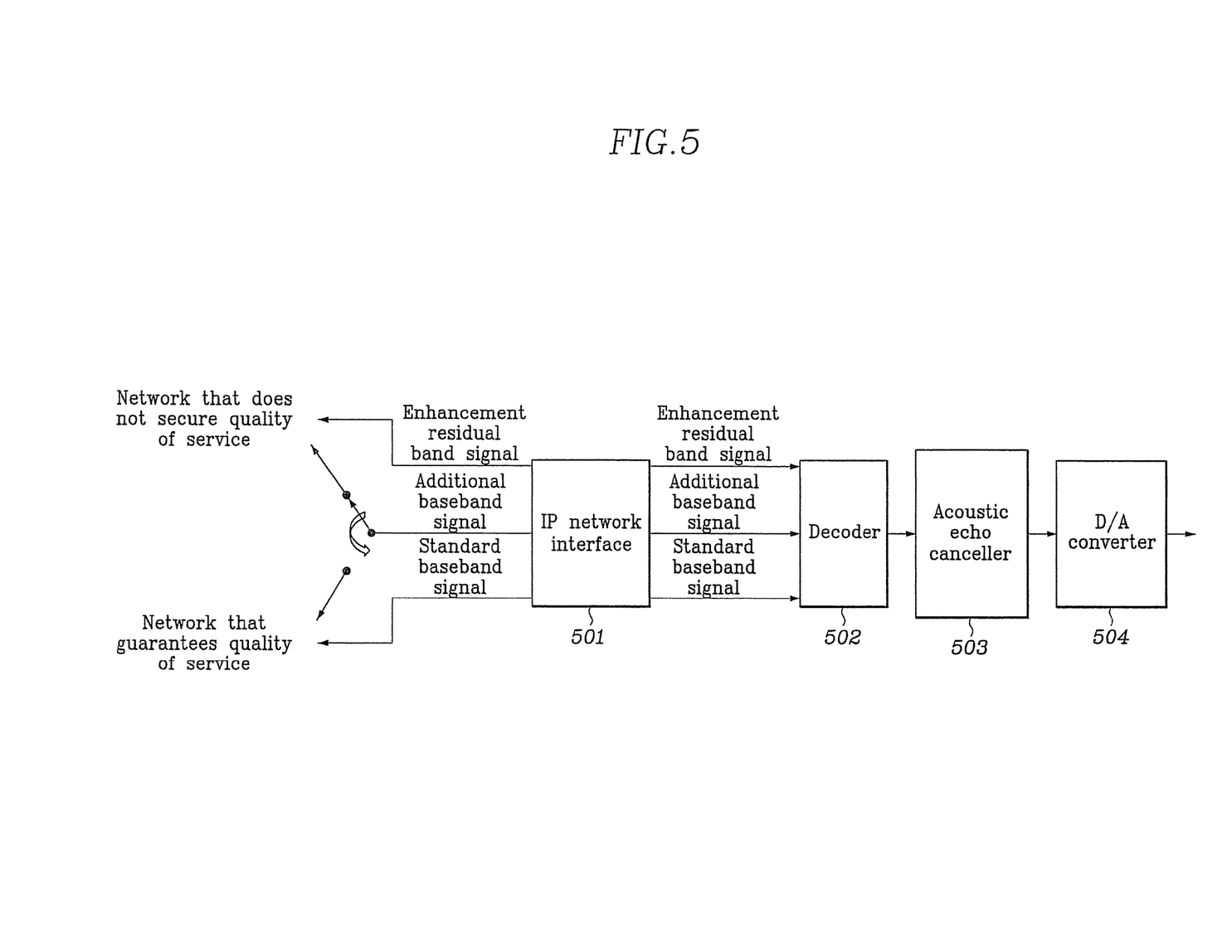
FIG. 5 shows the configuration of the receiver according to the present invention.
Figure 6:
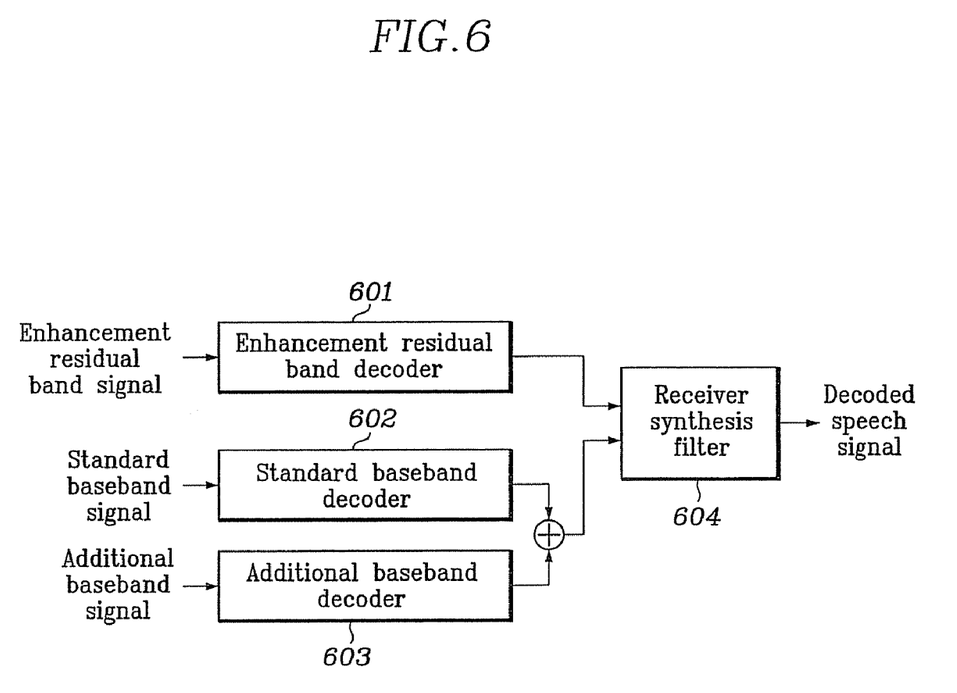
FIG. 6 shows the decoder of the receiver of FIG. 2 in detail.

The wideband speech signal receiver according to an embodiment of the present invention is described with reference to FIG. 5 and FIG. 6. FIG. 5 shows the wideband speech signal receiver of the present invention and FIG. 6 illustrates the decoder shown in FIG. 5 in more detail.

Referring to FIG. 5, the wideband speech signal receiver of the invention includes an IP network interface 501, a decoder 502, an acoustic echo canceller 503, and a D/A converter 504. The IP network interface 501 receives a multiplexed standard baseband signal, additional baseband signal, and if required, the enhancement residual band signal, and demultiplexes them, to extract coded baseband speech signals or an enhancement residual band speech signal. The decoder 502 accepts the baseband speech signals and enhancement residual band speech signal extracted by the IP network interface 501 to decode them, and synthesizes the baseband speech signals and enhancement residual band speech signal into one speech signal. Here, the decoding method is identical to the above-described coding method. The detailed configuration of the decoder will be explained later with reference to FIG. 6.

The acoustic echo canceller 503 receives the synthesized speech signal from the decoder 502 to cancel echo. As the acoustic echo canceller of the present invention, an acoustic echo canceller standardized by ITU-T G.167 can be used. The D/A converter 504 accepts the speech signal from which the echo has been removed to convert it into an analog signal. This analog signal can be provided to a user through a speech signal output unit.

The decoder 502 is explained in more detail with reference to FIG. 6. Referring to FIG. 6, the decoder 502 includes an enhancement residual band decoder 601, a standard baseband decoder 602, an additional baseband decoder 603, and a receiver synthesis filter 605. The enhancement residual decoder 601 receives the coded enhancement residual band speech signal transmitted from the transmitter, and decodes the enhancement residual band speech signal through waveform decoding or transform decoding. The standard baseband decoder 602 accepts the coded baseband speech signal and decodes it according to G.723.1 or G.729A, to output a baseband speech signal. The additional baseband decoder 603 receives the additional baseband signal to decode it. The signal decoded by the additional baseband decoder 603 and the signal from the standard baseband decoder 602 are synthesized to produce a final baseband synthesis signal. The receiver synthesis filter 604 synthesizes the signal outputted from the enhancement residual band decoder 601 and the baseband synthesis signal, to obtain a finally decoded speech signal.

Figure 7:
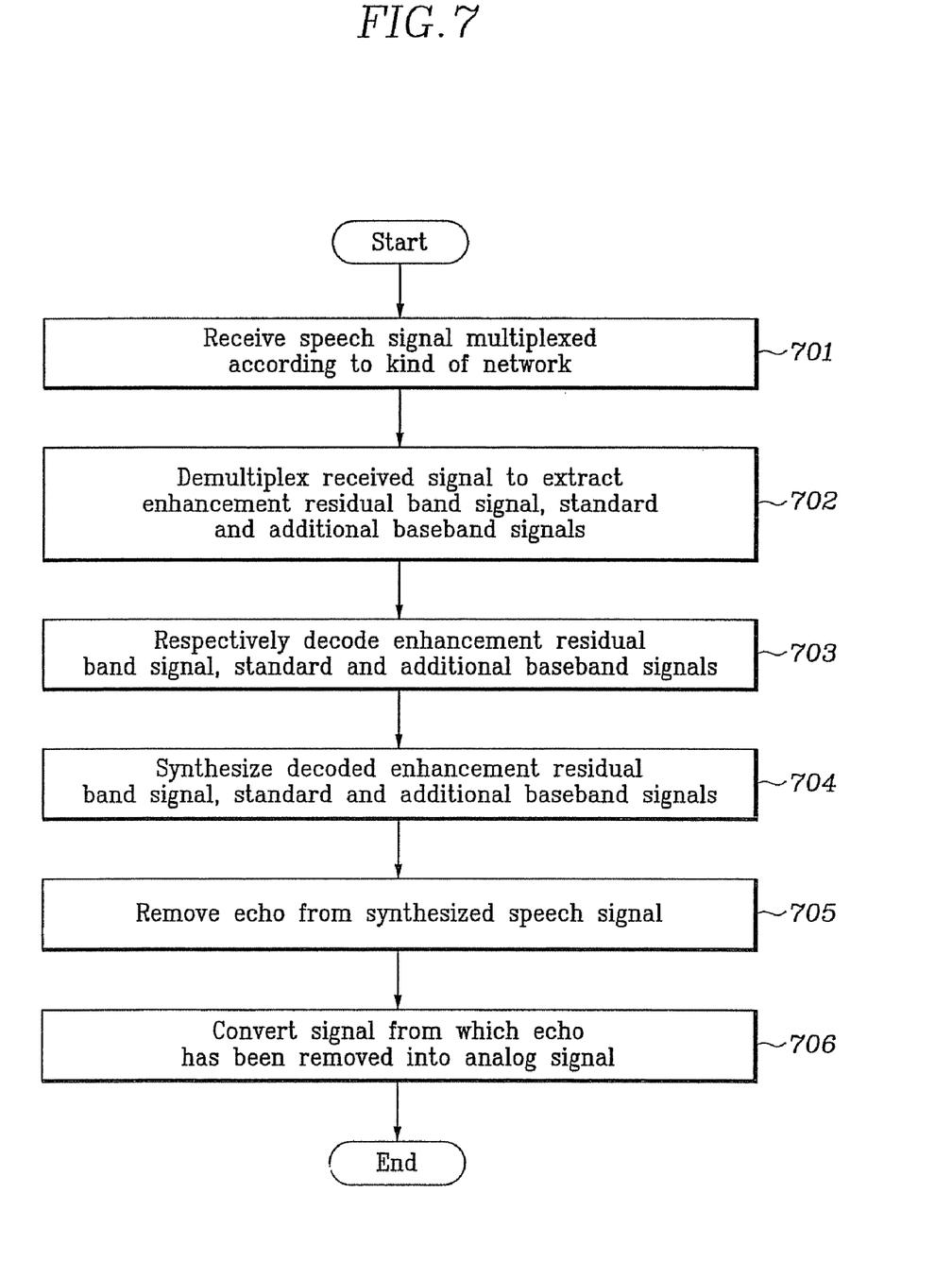
FIG. 7 is a flow chart showing a receiving method according to the present invention.

A method of receiving a wideband speech signal according to an embodiment of the present invention with reference to FIG. 7 will now be explained. FIG. 7 is a flow chart showing the receiving method.

When the receiving operation starts, a speech signal multiplexed according to the kind of network is received at step 701. The received signal is demultiplexed to be divided into an enhancement residual band signal and a baseband speech signal at step 702. The baseband speech signal consists of a standard baseband signal and an additional baseband signal. The enhancement residual band signal and the baseband speech signals are respectively decoded at step 703. The decoded enhancement residual band signal and baseband speech signals are synthesized into a single speech signal at step 704. Subsequently, echo in the synthesized speech signal is cancelled at step 705. The speech signal obtained at step 705 is converted into an analog signal at step 706. Here, the speech signal decoding method is identical to the decoding method explained in FIG. 5 and FIG. 6.

Figure 8:
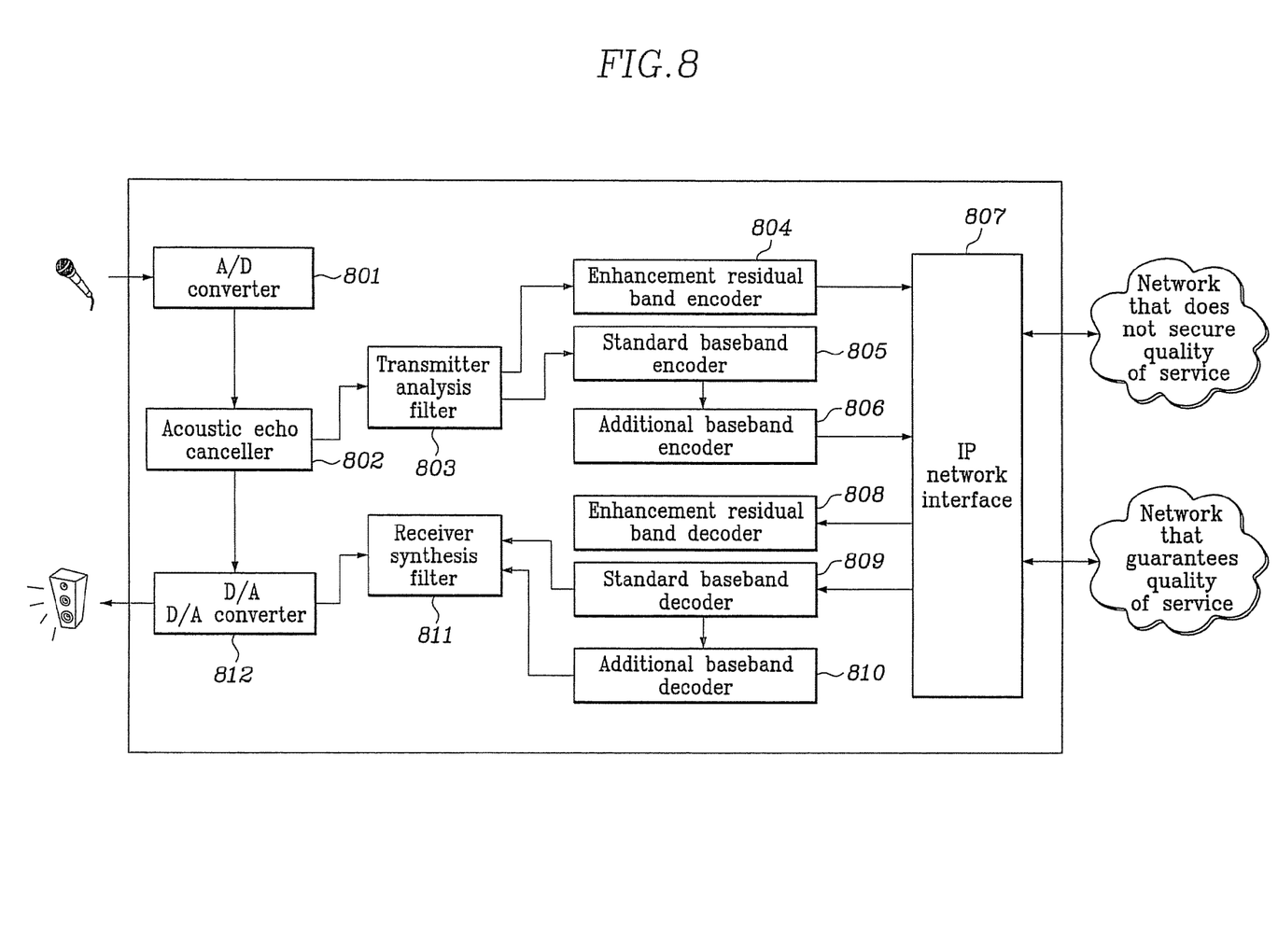
FIG. 8 shows a transceiver according to the present invention.

FIG. 8 shows a preferred configuration of a transceiver system in which the transmitter and receiver for transmitting and receiving wideband speech signals according to the present invention are integrated into a single terminal.

Referring to FIG. 8, an A/D converter 801 receives an analog speech signal from a user through a microphone and converts it into a digital speech signal, then an acoustic echo canceller 802 cancels echo in the digital speech signal received from the A/D converter 801. In addition, the acoustic echo canceller 802 accepts a received digital speech signal to cancel echo included therein. An enhancement residual band encoder 804 receives an enhancement residual band signal from a transmitter filter 803 to code it through waveform coding or transform coding and output the coded signal to an IP network interface 807.

A baseband encoder is divided into a standard baseband encoder 805 and an additional baseband encoder 806. The standard baseband encoder 805 accepts the baseband signal from the transmitter filter 803 to code it according to G.723.1 or G.729A, and outputs the coded signal to the network interface 807. The additional baseband encoder 806 codes the signal coded by the standard baseband encoder 805 through waveform coding or transform coding in order to reduce distortion in the signal, and then outputs the coded signal to the network interface 807.

The IP network interface 807 respectively receives the coded enhancement residual band signal and the coded standard and additional baseband signals from the enhancement residual encoder 804, the standard baseband encoder 805, and the additional baseband encoder 806 to multiplex them. Here, the enhancement residual band signal and the standard and additional baseband signals are multiplexed in various combination manners according to the kind of network through which the signals are to be transmitted. The multiplexed signal is delivered to the network connected to the network interface 807. In the case that all the networks provided for speech signal communication secure quality of service, the baseband signals and enhancement residual band signal are simultaneously packetized or only the baseband signals are packetized to be transmitted. When a network that guarantees quality of service and a network that does not secure quality of service are simultaneously provided, the baseband speech signal that is relatively important information is transmitted through the network that guarantees quality of service and the enhancement residual band signal is delivered through the network that does not secure quality of service. Here, even in the case that packet error or jitter is generated on the network that does not secure quality of service, speech quality is much better than that obtained in the case of using only the baseband speech signal. Finally, if all the networks do not guarantee quality of service, the baseband speech signals and enhancement residual band signal are simultaneously packetized or only the baseband speech signals are packetized to be transmitted, as in the first case.

The IP network interface 807 receives a multiplexed signal from a network obtained by multiplexing the baseband speech signals or enhancement residual band signal according to the kind of network the signal is received from, and demultiplexes it to extract a coded enhancement residual band signal and a coded baseband speech signal. An enhancement residual band decoder 808 receives the extracted coded enhancement residual band speech signal from the IP network interface 807 to decode it according to waveform decoding or transform decoding.

A standard baseband decoder 809 and an additional baseband decoder 810 accept the extracted baseband speech signal to standard-decode it according to G.723.1 or G.729A and decode an additional baseband signal. A receiver synthesis filter 811 receives the speech signals decoded by the enhancement residual band decoder 808 and the baseband decoders 809 and 810 to synthesize them into a single signal and output this signal to a D/A converter 812. The D/A converter 812 receives the speech signal whose echo has been cancelled from the acoustic echo canceller 802 to convert it into an analog signal. This analog signal can be provided to a user through a speech output unit.

The digital speech signal converted from the analog speech signal inputted by a user is a 16-bit linear PCM signal and has a sampling rate of 16 kHz. The baseband speech signal has a sampling rate of 8 kHz and a bandwidth of 0-4 kHz. The enhancement residual band signal has a sampling rate of 16 kHz and a bandwidth of 0-8 kHz, or it has a sampling rate of 8 kHz and a bandwidth of 4-8 kHz.

The transmitting and receiving methods according to the embodiments of the present invention can be constructed of a program executable on a computer and they can be realized on a general digital computer operating the program using a recording medium readable by the computer. The recording medium includes a magnetic storage medium (for example, ROM, floppy disk, hard disk, etc.), an optically read medium (for instance, CD-ROM, DVD, etc.) and a carrier wave (for example, transmission through the Internet).

Although specific embodiments including the preferred embodiment have been illustrated and described, it will be obvious to those skilled in the art that various modifications may be made without departing from the spirit and scope of the present invention, which is intended to be limited solely by the appended claims.

As described above, the system of the present invention is compatible with the current coding method when only signals using only the standard baseband encoder are utilized according to a user's choice. Thus, there is no need to use a new system. Furthermore, high quality speech communication can be carried out if the additional baseband signal and enhancement residual band signal are used in addition to the standard baseband signal. Moreover, speech signals are multiplexed in various manners according to the kind of network and transmitted through the network so that the speech signals can be efficiently delivered. In addition, in order to reproduce high sound quality, echo is cancelled so a loud speaker may be used. This produces a better communication environment.

What is claimed is:

1. A system for transmitting a wideband speech signal, comprising:

an A/D converter for receiving an analog speech signal to convert the analog speech signal into a digital speech signal;

an encoder to separate a baseband speech signal from the digital speech signal, standard-coding the baseband speech signal to generate a standard baseband signal, coding a difference between the baseband speech signal and the standard baseband signal to generate an additional baseband signal, and coding a difference between a signal obtained by synthesizing the standard baseband signal and the additional baseband signal and the baseband speech signal to generate an enhancement residual band signal; and an network interface to receive the standard baseband signal, the additional baseband signal, and the enhancement residual band signal generated by the encoder, multiplexing the standard baseband signal, the additional baseband signal, and the enhancement residual band signal, and transmitting the multiplexed signals to an external network.

2. The system for transmitting a wideband speech signal as claimed in claim 1, wherein the encoder comprises:

a transmitter analysis filter to receive the digital speech signal and to divide the digital speech signal into the baseband speech signal and the enhancement residual band signal;

a standard baseband encoder for standard-coding the baseband speech signal to generate the standard baseband signal;

an additional baseband encoder for coding the difference between the baseband speech signal and the standard baseband signal, to generate the additional baseband signal; and an enhancement residual band encoder for coding the difference between a signal obtained by synthesizing the standard baseband signal and the additional baseband signal, and the baseband speech signal, to generate the enhancement residual band signal.

3. The system for transmitting a wideband speech signal as claimed in claim 2, wherein the standard baseband encoder codes the baseband speech signal according to G.723.1 or G.729A, and the additional baseband encoder codes the difference between the baseband speech signal and the standard baseband signal through waveform coding or transform coding, the human acoustic characteristic being reflected on the waveform coding or transform coding.

4. The system for transmitting a wideband speech signal as claimed in claim 1, wherein the network interface simultaneously packetizes the enhancement residual band signal, the standard baseband signal, and the additional baseband signal and transmits the enhancement residual band signal, the standard baseband signal, and the additional baseband signal, or packetizes the standard baseband signal and the additional baseband signal and transmits the standard baseband signal and the additional baseband signal, in the case that the network connected to the transmitting system includes a network that secures quality of service or a network that does not guarantee quality of service, and when the network connected to the transmitting system includes both the network that secures quality of service and the network that does not guarantee quality of service, the network interface packetizes the standard baseband signal to transmit the packetized additional baseband signal and enhancement residual band signal, the packetized standard baseband signal through the network that secures quality of service, and packetizes the additional baseband signal and enhancement residual band signal to deliver them through the network that does not guarantee quality of service.

5. The system for transmitting a wideband speech signal as claimed in claim 1, wherein, when the network connected to the transmitting system includes both the network that secures quality of service and the network that does not guarantee quality of service, the network interface packetizes the standard baseband signal and additional baseband signal to transmit the packetized standard baseband signal and additional baseband signal through the network that secures quality of service, and packetizes the enhancement residual band signal to deliver the packetized enhancement residual band signal through the network that does not guarantee quality of service.

6. The system for transmitting a wideband speech signal as claimed in claim 1, wherein the digital speech signal outputted from the A/D converter is sampled at the rate of 16 kHz and has a frequency band of 0-8 kHz, the enhancement residual band signal has a sampling rate of 16 kHz and a frequency of 0-8 kHz, and the baseband speech signal has a sampling rate of 8 kHz and a frequency band of 0-4 kHz.

7. The system for transmitting a wideband speech signal as claimed in claim 1, wherein the digital speech signal outputted from the A/D converter is sampled at the rate of 16 kHz and has a frequency band of 0-8 kHz, the enhancement residual band signal has a sampling rate of 8 kHz and a frequency band of 0-4 kHz through down-sampling, and the baseband speech signal has a sampling rate of 8 kHz and a frequency band of 0-4 kHz.

8. A system for receiving a wideband speech signal, comprising:

an network interface for demultiplexing a speech signal transmitted through a network to extract a coded standard baseband signal, a coded additional baseband signal, and a coded enhancement residual band signal;

a decoder for standard-decoding the standard baseband signal, to decode the additional baseband signal, and to synthesize the decoded signals to generate a baseband synthesis signal, to decode the enhancement residual band signal and synthesize the decoded enhancement residual band signal and the baseband synthesis signal to generate a final decoded speech signal; and a D/A converter convert the decoded speech signal into an analog signal.

9. The system for receiving a wideband speech signal as claimed in claim 8, wherein the decoder comprises:

an enhancement residual band decoder to receive the enhancement residual band signal extracted by the network interface and decode the enhancement residual band signal through waveform decoding or transform decoding;

a standard baseband decoder to receive the standard baseband signal extracted by the network interface and decoding it according to G.723.1 or G.729A;

an additional baseband decoder receive the additional baseband signal extracted by the network interface and decoding the extracted additional baseband signal; and a receiver synthesis filter for synthesizing the signal outputted from the standard baseband decoder and the signal outputted from the additional baseband decoder to generate a baseband signal, and synthesizing the baseband signal and the enhancement residual band signal to generate a finally decoded speech signal.

10. The system for receiving a wideband speech signal as claimed in claim 8, wherein the enhancement residual band signal has a sampling rate of 16 kHz and a frequency band of 0-8 kHz or a sampling rate of 8 kHz and a frequency band of 4-8 kHz, and the baseband speech signal has a sampling rate of 8 kHz and a frequency band of 0-4 kHz.

* * * * *